United States Patent
Ikeda et al.

(10) Patent No.: US 8,008,562 B2
(45) Date of Patent: Aug. 30, 2011

(54) IMAGE PROCESSING APPARATUS, MUSICAL SCORE EDITING METHOD EXECUTED THEREON, AND STORAGE MEDIUM STORING PROGRAM

(75) Inventors: Tohru Ikeda, Yokohama (JP); Fumihiro Goto, Kawasaki (JP); Manabu Yamazoe, Tokyo (JP); Maya Ishii, Kawasaki (JP); Ayumi Sano, Kawasaki (JP); Hidetsugu Kagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/712,415

(22) Filed: Feb. 25, 2010

(65) Prior Publication Data

US 2010/0236381 A1 Sep. 23, 2010

(30) Foreign Application Priority Data

Mar. 18, 2009 (JP) ................... 2009-066903

(51) Int. Cl.
G09B 15/02 (2006.01)
(52) U.S. Cl. .................... 84/477 R; 84/470 R
(58) Field of Classification Search ............. 84/477 R, 84/470 R
See application file for complete search history.

(56) References Cited

U.S. PATENT DOCUMENTS

| | | | | |
|---|---|---|---|---|
| 4,914,709 A * | 4/1990 | Rudak | | 382/311 |
| 4,974,260 A * | 11/1990 | Rudak | | 382/311 |
| 5,544,562 A * | 8/1996 | Jeon | | 84/470 R |
| 5,790,688 A * | 8/1998 | Kikuchi | | 382/113 |
| 5,825,905 A * | 10/1998 | Kikuchi | | 382/113 |
| 5,883,970 A * | 3/1999 | Kikuchi | | 382/113 |
| 6,137,041 A * | 10/2000 | Nakano | | 84/470 R |
| 6,272,238 B1 * | 8/2001 | Kugai | | 382/165 |
| 6,281,420 B1 * | 8/2001 | Suzuki et al. | | 84/477 R |
| 6,608,926 B1 | 8/2003 | Suwa et al. | | 382/162 |
| 6,694,051 B1 | 2/2004 | Yamazoe et al. | | 382/167 |
| 7,006,668 B2 | 2/2006 | Iguchi et al. | | 382/108 |
| 7,167,205 B2 | 1/2007 | Akiyama et al. | | 348/364 |
| 7,369,163 B2 | 5/2008 | Akiyama et al. | | 348/231.3 |
| 7,518,057 B2 * | 4/2009 | Worrall et al. | | 84/722 |
| 7,560,635 B2 * | 7/2009 | Funaki | | 84/478 |
| 7,714,222 B2 * | 5/2010 | Taub et al. | | 84/600 |
| 7,847,175 B2 * | 12/2010 | Nakano | | 84/616 |
| 2005/0134892 A1 | 6/2005 | Goto et al. | | 358/1.13 |
| 2006/0150803 A1 * | 7/2006 | Taub | | 84/616 |
| 2007/0012165 A1 * | 1/2007 | Noh et al. | | 84/616 |
| 2008/0002766 A1 | 1/2008 | Suwa et al. | | 375/240.12 |
| 2008/0123150 A1 | 5/2008 | Ono et al. | | 358/3.27 |
| 2008/0123153 A1 | 5/2008 | Yamada et al. | | 358/3.27 |
| 2009/0202144 A1 * | 8/2009 | Taub et al. | | 382/156 |
| 2010/0236381 A1 * | 9/2010 | Ikeda et al. | | 84/477 R |
| 2010/0313737 A1 * | 12/2010 | Fahn et al. | | 84/477 R |
| 2010/0321742 A1 * | 12/2010 | Downs, III | | 358/474 |

FOREIGN PATENT DOCUMENTS

| | | |
|---|---|---|
| JP | 01-099169 | 4/1989 |
| JP | 02-121857 | 5/1990 |
| JP | 07-044162 | 2/1995 |
| JP | 07-225817 | 8/1995 |
| JP | 11-030982 | 2/1999 |

* cited by examiner

*Primary Examiner* — Jeffrey Donels
*Assistant Examiner* — Robert W Horn
(74) *Attorney, Agent, or Firm* — Fitzpatrick, Cella, Harper & Scinto

(57) ABSTRACT

An image processing apparatus that processes image data representing a musical score inputs image data of a musical score document to the image processing apparatus, detects a blank area in the musical score based on the input image data, and generates image data in which an assistance sign has been added in the blank area in correspondence with a sign in the musical score.

11 Claims, 9 Drawing Sheets

| ROOT | CHORD TONES | CHORD NAME |
|---|---|---|
| c | ceg | C |
| g | gdbf | G7 |
| a | ace | Am |
|  |  |  |

IMAGE PROCESSING APPARATUS, MUSICAL SCORE EDITING METHOD EXECUTED THEREON, AND STORAGE MEDIUM STORING PROGRAM

BACKGROUND OF THE INVENTION

1. Field of the Invention

The present invention relates to image processing apparatuses that process image data representing musical scores, musical score editing methods and storage media storing a program.

2. Description of the Related Art

Among various types of documents, musical scores representing a musical piece include information that is necessary for interpreting the piece according to rules that have been developed and accumulated in the past. Taking information on musical notes as an example, the information on notes written in the musical score covers information on pitch, chords as a combination of tones, tone length, rhythm and the like. In addition, dynamics, changes in rhythm, instructions for sequence, instructions for "emotion" or the like of performance are written in the musical score in the form of signs or symbols. Performers write in the musical score signs that are easy for them to understand, or ask experienced performers to write such signs in the musical score. As regards famous musical pieces, publishers of the musical scores thereof have been publicizing the musical scores with readily-understood simple signs added thereto. Also, particularly, some books on music for beginners contain, in the case of chords for example, diagrams showing which fret of which string should be pressed on the guitar, or diagrams showing which keys should be struck on the keyboard. A method for publishers for editing performance assistance data called guitar TABs based on electric data is disclosed in Japanese Patent Laid-Open No. 2-121857.

While it is possible to purchase musical scores of well-known musical pieces in which such performance assistance signs have been added, in the case of an originally composed musical piece, the composer has to insert these signs into the musical score thereof in accordance with the level of proficiency of those who are to use the musical score. Alternatively, the user of the musical score is required to write these signs into the musical score for himself/herself, or to ask an experienced performer to write these signs into the musical score, which is very inefficient.

SUMMARY OF THE INVENTION

An aspect of the present invention is to eliminate the above-mentioned problems with the conventional technology. The present invention provides musical score editing methods and image processing apparatuses with which assistance signs can be easily added, as well as storage media storing a program.

The present invention according to its first aspect provides a musical score editing method for editing a musical score by processing image data representing the musical score with an image processing apparatus, the method comprising the steps of: inputting image data of a musical score document to the image processing apparatus; detecting a blank area in the musical score based on the input image data; and generating image data in which an assistance sign has been added in the blank area in correspondence with a sign in the musical score.

The present invention according to its second aspect provides an image processing apparatus that processes image data representing a musical score, comprising: a input unit configured to input image data of a musical score document to the image processing apparatus; a detection unit configured to detect a blank area in the musical score based on the input image data; and a generation unit configured to generate image data in which an assistance sign has been added in the blank area in correspondence with a sign in the musical score.

The present invention according to its third aspect provides a computer-readable storage medium storing a program executed in an image processing apparatus for processing image data representing a musical score, the program causing a computer to: input image data of a musical score document to the image processing apparatus; detect a blank area in the musical score based on the input image data; and generate image data in which an assistance sign has been added in the blank area in correspondence with a sign in the musical score.

The present invention enables the generating of musical score data to which assistance signs have been added based on the original musical score.

Further features of the present invention will become apparent from the following description of exemplary embodiments with reference to the attached drawings.

DESCRIPTION OF THE EMBODIMENTS

Figure 1:
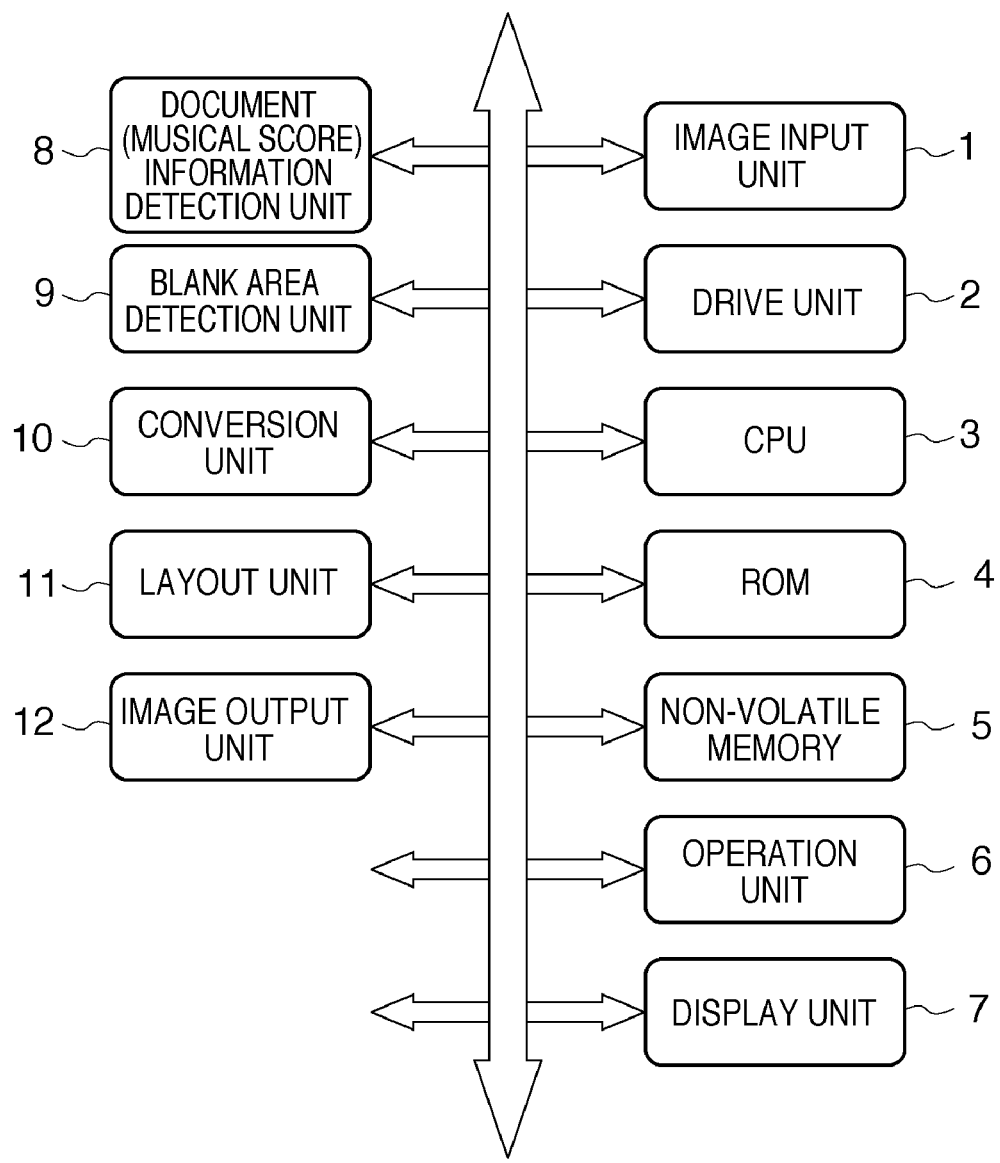
FIG. 1 is a block diagram showing an example configuration of an image processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. It should be noted that the same reference numerals are assigned to identical constituent elements, and corresponding descriptions shall be omitted.

First Embodiment

FIG. 1 is a block diagram showing an example configuration of an image processing apparatus 100 according to the present embodiment. An MFP (multifunction peripheral) is used as the image processing apparatus 100 shown in FIG. 1. In FIG. 1, an image input unit 1 inputs an image on which editing is performed. The image input unit 1 is used when using data that is already digitalized and when performing image reading. While a case is described below as an example in which a document image is read with a scanner or the like, the description is also applicable to the case of using digitalized data. The image input unit 1 performs photoelectric conversion with a light-receiving element on light reflected from the document image or light that has transmitted through the document image so as to obtain multi-valued luminance data.

A drive unit 2 is constituted by a motor for operation of the image input unit 1 and an image output unit 12, gears for transmitting driving power from the motor, and a drive circuit that controls the motor, for example. Here, if a line sensor aligned in one direction is used, the direction parallel to the line sensor is called "main scanning direction", and the direction perpendicular to the line sensor is called "sub-scanning direction". That is, the movement direction achieved by the drive unit 2 is the sub-scanning direction. A CPU 3 controls various functions of the image processing apparatus 100, and executes an image processing program stored in a ROM 4 according to a predetermined operation entered through an operation unit 6. A non-volatile memory 5 is constituted by a battery backed-up SRAM, a rewritable ROM or the like, and stores data unique to the image processing apparatus. For example, the non-volatile memory 5 stores information necessary to display assistance signs described later.

The operation unit 6 is constituted by setting keys for image editing processing, a key for selecting the conversion to be performed, a start key, a mode key, a color/monochrome print switching key, a stop key for stopping operation, a numeric keypad for inputting output copy number, or the like. The CPU 3 detects the pressing state of these keys and controls each unit depending on the detected state. A display unit 7 includes a liquid crystal display (LCD) of the dot matrix type and an LCD driver, and provides various types of display under the control by the CPU 3. Also, the display unit 7 displays thumbnail images of the scanned image data. The user can instruct details of image editing described later with the operation unit 6 and display unit 7.

A document (musical score) information detection unit 8 analyzes an image and obtains information on the document. Here, the document (musical score) information detection unit 8 detects pitch, tone length, tone combination (chord) in the musical score serving as the document, and signs in the musical score (such as dynamics markings). A blank area detection unit 9 detects blank portions in the document containing no information as a blank area necessary for placing assistance signs described later. A conversion unit 10 performs conversion processing on the information detected from the document according to instructions for editing details given by the user. A layout unit 11 edits layouts for placing assistance signs based on the data indicating the information in the document obtained by the conversion and the data on the blank area. The image output unit 12 is constituted by an inkjet head, an electrophotographic printer, a control IC or the like. The image output unit 12 reads out print data stored in the non-volatile memory 5 as controlled by the CPU 3, and outputs the read print data as a hard copy. Particularly, in the present embodiment, the image output unit 12 prints on paper or outputs on a display an image that has undergone the layout editing.

Figure 2:
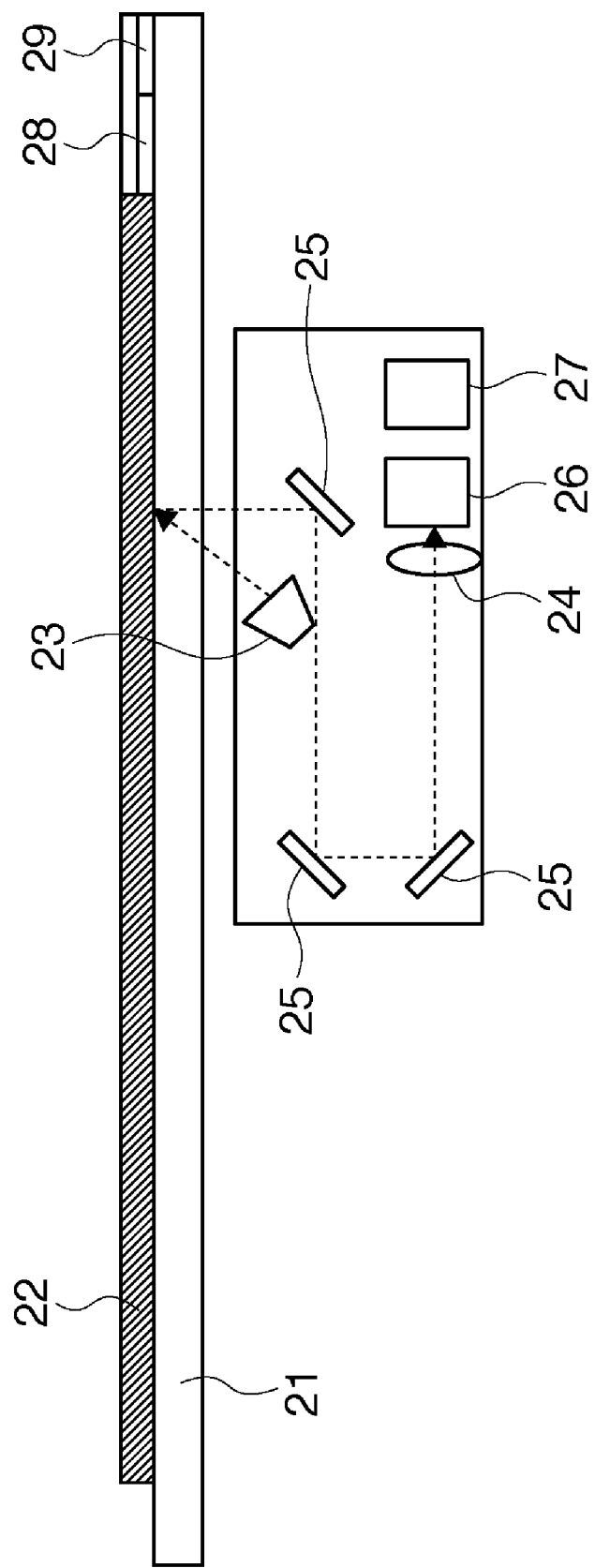
FIG. 2 is a diagram showing a specific example configuration of an image input unit.

FIG. 2 shows a specific configuration example of the image input unit 1 shown in FIG. 1. A light source 23 irradiates a document 22 to be read that is placed on a platen glass 21. A lens 24 collects light that is reflected/diffused by the document. A light-receiving sensor 26 performs photoelectric conversion on the light collected in an optical system including the lens 24 and mirrors 25. CCD sensors or CMOS sensors, for example, can be used as the light-receiving sensor 26. An electrical circuit 27 serves as an analog front end that converts analog signals into digital signals. A reference plate 28 is attached at the reading position on the surface of the platen glass 21, and is used for shading correction. In the case of reading a color image, white light is used as the light source 23, and after light of particular wavelengths has been absorbed with RGB filters, the light is photoelectrically converted with a light-receiving sensor so that a color image is obtained. Alternatively, a color image may be obtained by sequentially lighting light sources having the wavelengths of red, green and blue and performing photoelectric conversion with a light-receiving sensor. Moreover, schemes generally adopted in the optical system in FIG. 2 include a reducing optical system in which an image is reduced with a lens, and a CIS (contact image sensor) system in which a document is scanned with a sensor that covers the same width as the image. The drive unit 2 includes an optical system made up of the light source 23, the lens 24 and the mirrors 25, the light-receiving sensor 26 and the electrical circuit 27, and is caused to move in the sub-scanning direction, so that the image data of the document is obtained.

Description of Overall Processing Flow

Figure 3:
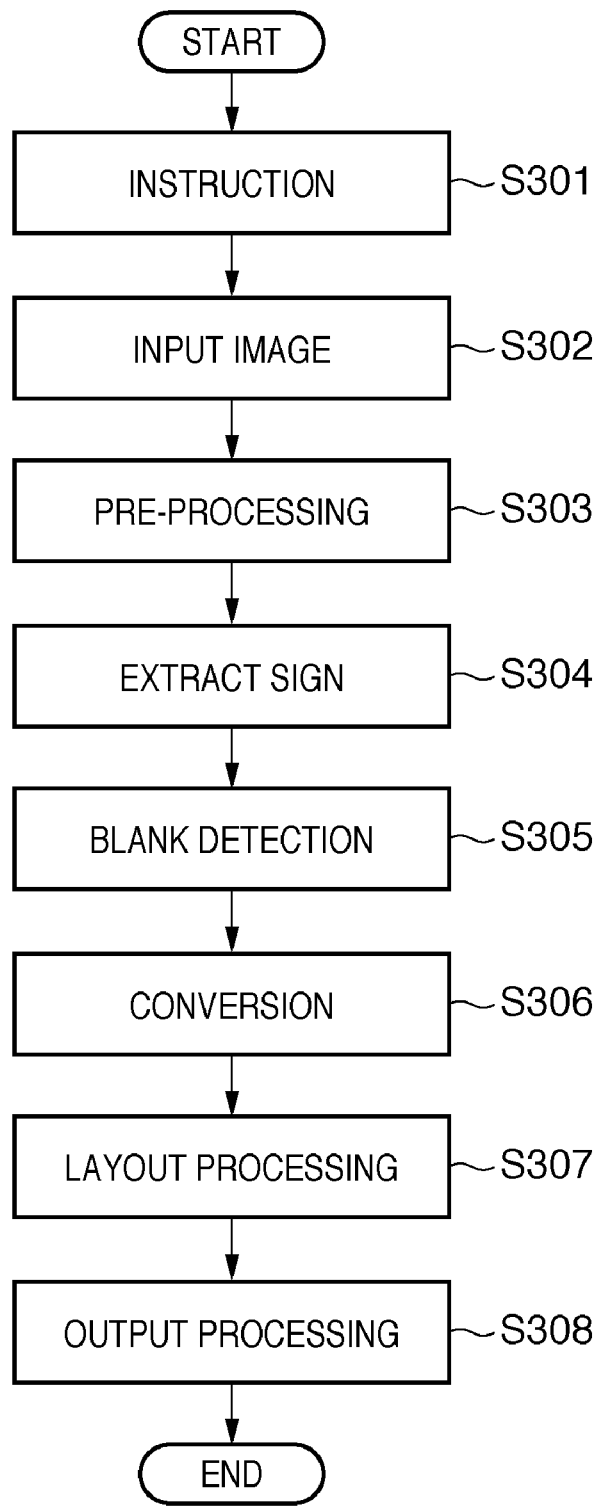
FIG. 3 is a flowchart of a musical score editing method executed in an image processing apparatus.

FIG. 3 is a flowchart of a musical score editing method executed by the image processing apparatus of the present embodiment. Below, each step therein will be described. In step S301, the user gives an instruction with details of the desired editing. In the present embodiment, editing details are displayed classified with a plurality of tabs, specifically, editing details for the instruments such as piano, guitar or chorus, or editing details for kana-readings, description of signs or the like. The use of a plurality of tabs enables editing a large amount of editing details with ease. For example, when a musical score editing mode is selected, editing details are instructed through the use of the operation unit 6 and the display unit 7, according to the display examples described below.

Figure 4A:
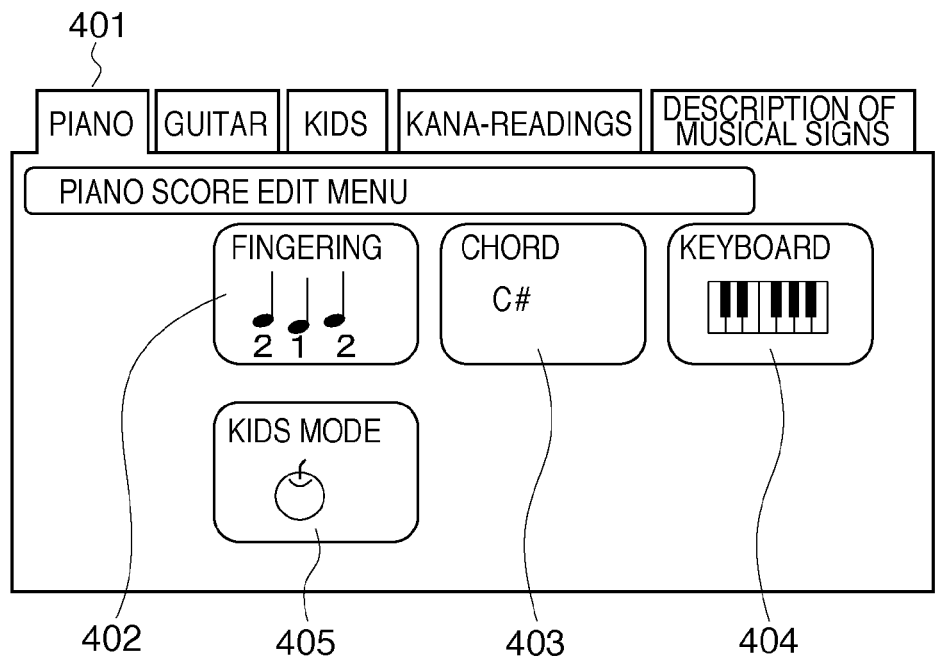
FIG. 4A is a diagram showing an example of editing details displayed by a display unit.

FIG. 4A is a diagram showing an example of a man-machine interface displayed in the display unit 7. Firstly, when the user wants to display a tab sheet for a piano performance, the user selects a tab sheet 401 for editing assistance signs. The user further selects which type of assistance sign among the possible choices displayed in the tab should be added in the musical score. The assistance signs include assistance signs 402 for fingering that indicate which finger of the left and right hands should be used to play the respective musical notes in the musical score, and an assistance sign 403 showing a chord name. Also, the assistance signs include an assistance sign 404 that simply indicates which key on the keyboard should be struck, or an assistance sign 405 that shows a symbol instead of musical technical terms for simplicity so as not to give beginners, such as children, any sense of difficulty.

Figure 5A:
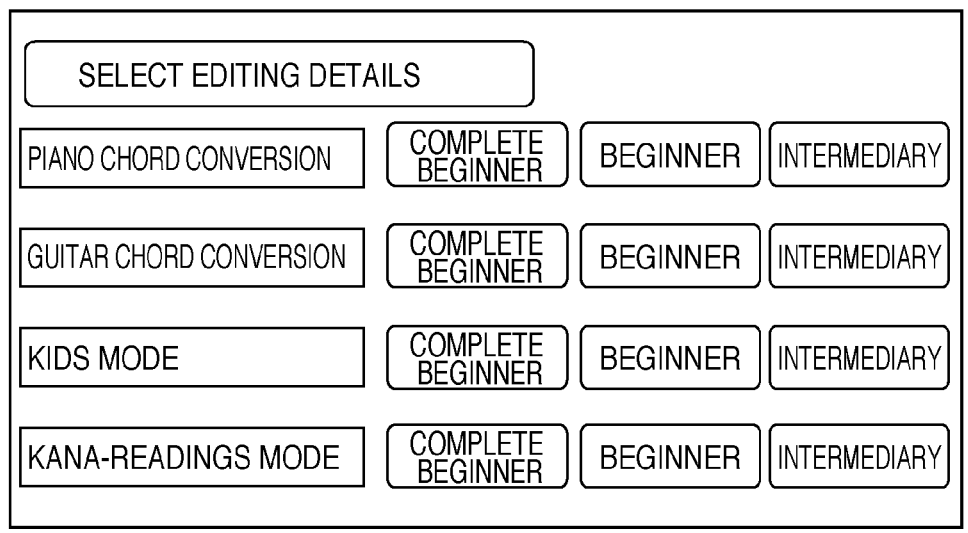
FIG. 5A is a diagram showing another example of editing details displayed by a display unit.
Figure 5B:
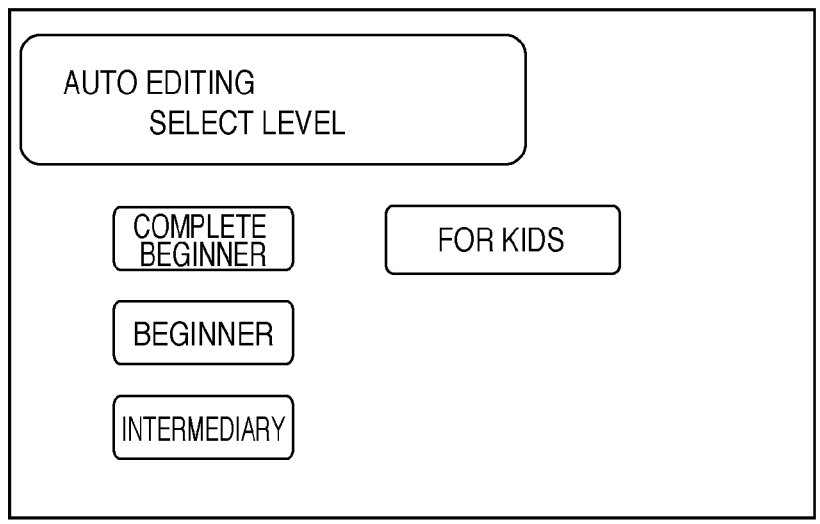
FIG. 5B is a diagram showing another example of editing details displayed by a display unit.

In addition, not only does the invention directly select a display method, the respective editing details may be further classified into "intermediary", "beginner", "complete beginner", "kids mode", as shown in FIG. 5A and FIG. 5B. When the "kids mode" is selected, in some cases it is preferable from the perspective of the practice of beginners and children, to display, for example, the same pictures or the same color signs as the seals affixed on the keyboard, instead of the picture of the keyboard.

Figure 4B:
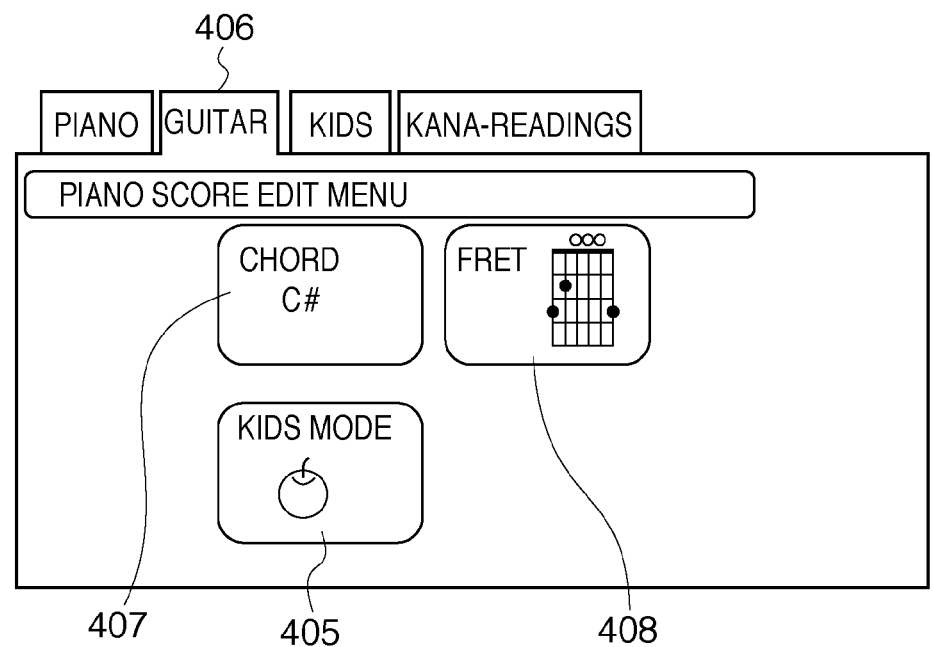
FIG. 4B is a diagram showing an example of editing details displayed by a display unit.

When the tab of the guitar musical score has been selected for editing, the display changes to a tab sheet 406 for editing guitar performance assistance signs as shown in FIG. 4B. Similar to the case of the tab sheet 401, the user selects from among the possible choices which type of the assistance sign is to be added to the musical score. For example, when a chord for guitar performance is to be added, an assistance sign 407 indicating chord information and an assistance sign 408 that displays fingering positions on the frets to play the chord are selected. In the case of performance assistance signs used for other instruments as well, another tab sheet is selected and a similar operation is performed. A tab sheet may be configured with which the intervals of musical notes can be added for vocal, not for musical instruments, or a learning-mode tab sheet may be configured in which the meaning of signs on the musical score is described in an easily understood manner. The tab sheets may be classified according to "fingering", "chords" and "icons", rather than according to the musical instruments as described above. Also, as an instruction given in step S301, in addition to instructions through the display unit 7 using the tab structure, other display methods or selection methods may be used.

Figure 6:
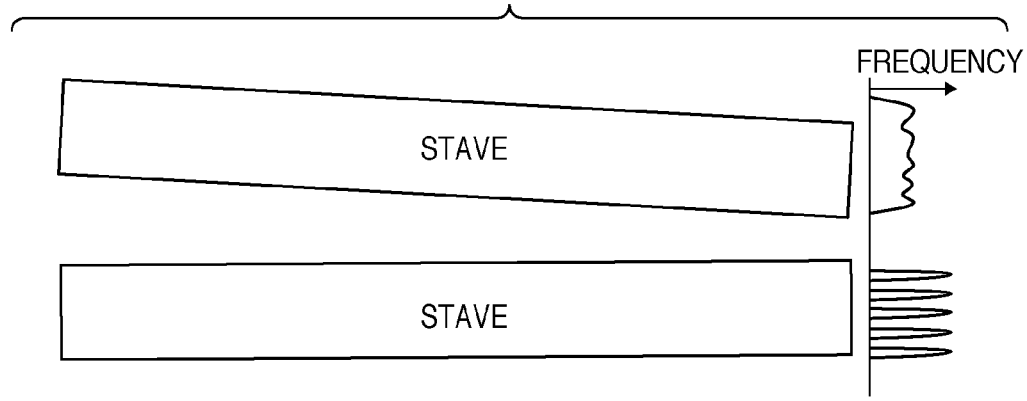
FIG. 6 shows an exemplary image read by the image input unit.

Below, a case will be described in which the user has selected the tab sheet 401 in step S301, and further has selected the assistance sign 402 indicating fingering for piano performance. In step S302, when an image is read by the image input unit 1, RGB signals obtained due to the spectral characteristics of the device undergo input profile conversion into a standard color space for image processing. In step S302, bitmap image data as shown in FIG. 6 is obtained as a result.

In step S303, tilt correction is performed on the image as pre-processing. Tilt correction is performed because a document may be tilted when the reading apparatus reads the document, or the musical score in the document itself may be tilted from the beginning. As a tilt correction, a method that utilizes the linearity of the image of the stave in the musical score is used for example. As shown in FIG. 6, when histograms are created for a plurality of tilt angles, the peak-trough fluctuation for the portion corresponding to the stave becomes great at an angle parallel to the stave. Specifically, the angle at which the straight lines of the stave on the data become parallel to the main scanning direction is calculated, and a rotational correction is performed on the entire image. If necessary, a binarization operation with a fixed or variable threshold is performed. Here, for the binarization method, a certain fixed threshold may be used, or when a maximum density or paper whiteness in the document differs between documents, an appropriate threshold may be calculated after creating a histogram of brightness. Also, thickening processing may be performed so as to improve fine line reproducibility in the stave or flags of musical notes, through the use of filtering processing. The image that has undergone pre-processing in step S303 is temporarily stored in a recording region as a new input image.

Based on the image data created as a result of this tilt correction, a reference position is determined using the information on the stave. Since the pitches expressed by the stave differ between G clef and F clef, for example, a G clef symbol or F clef symbol is detected first of all. These symbols appear at least at the head of bars, so that pattern matching with the G clef symbol and the F clef symbol pre-stored in ROM is carried out based on corresponding position information. When pattern matching is performed, a default size of the pattern is determined based on the space between staves, for example.

In step S304, based on the reference position information and information on the pitch derived from the symbol at the reference position, the pitch, the tone length, a tone combination (chord), and positional information for each bar are extracted from the musical score, and the extraction result is coded and stored in a storage area in the RAM. Furthermore, performance assistance signs, such as "eighth note=100", "fortissimo", and "crescendo" are also pattern-matched with the data pre-stored in the ROM, and the result thereof is coded and stored in a storage area in the RAM. It is also possible to adopt a configuration in which the size of the musical score in the document is detected based on the interval between staves, the size of the note head or the like, and the size of the musical score is used as a parameter for placing assistance signs.

Figure 7:
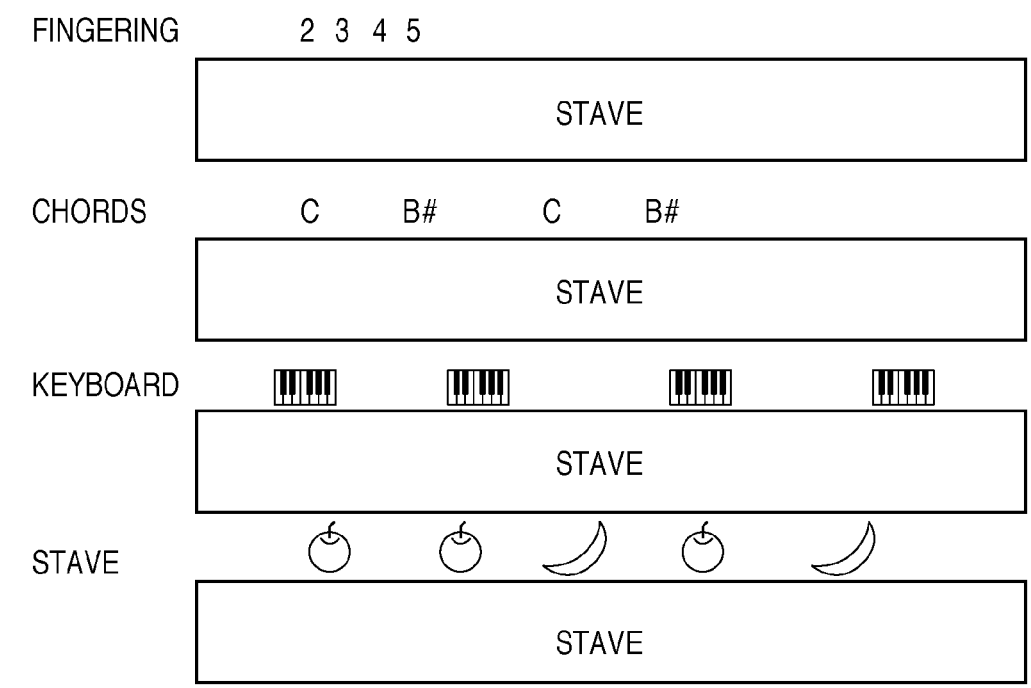
FIG. 7 illustrates prohibition regions and placement-possible regions.
Figures 8, 9:
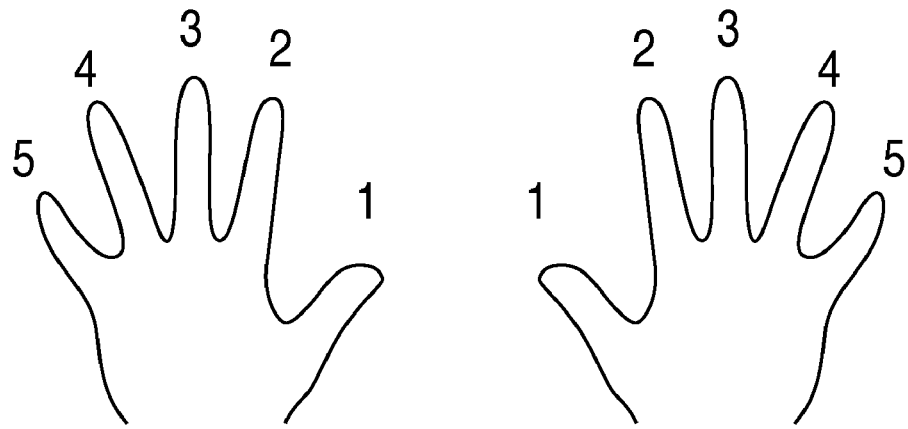
FIG. 8 shows an example of assigning numbers to fingers.
FIG. 9 shows a table used when converting musical data into chord names.

In step S305, the blank area is detected from the scanned document image. Then according to the detected blank area and the stave region that has undergone the tilt correction in step S303, a region where assistance signs can be placed ("placement-possible region") and a prohibition region where assistance signs cannot be placed are determined. As shown in FIG. 7, for example, the prohibition region corresponds to the stave region, and the placement-possible region corresponds to the blank area above the stave region. When determining the placement-possible region and the prohibition region, information on minutely detailed features may be inadequate for determining the placement of the assistance sign to be added, and thus, the respective regions also may be defined in units of blocks having a predetermined size. In step S306, the musical score information coded in step S304 is converted according to the editing details instructed in step S301. For example, when the assistance sign 402 for fingering shown in FIG. 4A has been selected, the data on the musical notes detected in step S304 is converted to numbers assigned to the fingers used to strike the corresponding keys during performance. In the case where numbers are assigned to the respective fingers as shown in FIG. 8, the user can play the music by striking the keys with the fingers assigned with these numbers.

In step S307, processing on a new input image created in step S303 is performed in which data converted in step S306 is placed according to the region information determined in step S305. In this case, the size of the converted data is optimized depending on the blank area. Here, if the converted data is added in different bars in different sizes, the viewer may perceive the image as visually unnatural. Therefore, for example, it is possible to place assistance signs of the same type in a size that is the largest in the possible placement sizes. In addition, the assistance signs may have a different color from the colors on the new input image so as to readily attract the user's attention. In the case of assistance signs for fingering, numbers (assistance signs) corresponding to the musical notes are inserted in the blank area. In this case, the numbers are placed at positions corresponding to those of the musical notes. For example, the numbers are placed in the blank area outside of the stave on the opposite side of the flag of a musical note. The font size of the number may be determined based on the musical note, so that the musical score can be easily read even after the assistance signs are added to the musical score of the document. For example, it is possible to set as a default to add the numbers with a font that is 1.5 times the musical note. Furthermore, the default font size may be adjusted in consideration of the size of the placement region. In step S308, the image in which the assistance signs have been placed in step S307 is printed out.

Second Embodiment

In the present embodiment, a case will be described in which an instruction is given in step S301 to perform editing for inserting a piano performance chord (assistance sign 403). Below, only aspects that are different from the first embodiment in the processing shown in FIG. 3 will be described.

In the present embodiment, the musical score data detected in step S304 is converted to a chord name in step S306. In step S306, firstly, the tones "do", "mi" and "so" in the musical score are respectively converted to "c", "e" and "g". Here, if for example the first bar is composed of the tones of "c", "e", "c", and "g" in this order, then this indicates a chord having the root tone of "c". In such a case, rules for conversion to chord names as shown in the table of FIG. 9 that is stored in the ROM in advance are sequentially referenced. In the above-described example, the chord name "C" is determined as the assistance sign, as shown in FIG. 9.

In step S307, the chord name as the assistance sign is placed near the head of each bar. Since the chord name is expressed with a small number of letters from the alphabet as shown in FIG. 9, the size of the region needed to place the same is variable. Accordingly, if other musical score information (assistance sign) has been already placed at the head portion of the bar, it is determined whether or not there is any other blank area for placing the chord name in the same bar. If it is determined that there is another blank area, the chord name is placed in that area, whereas if it is determined that there is no other blank area left, the chord name is placed after being shifted upward or downward, or being reduced in size.

Figure 10A:
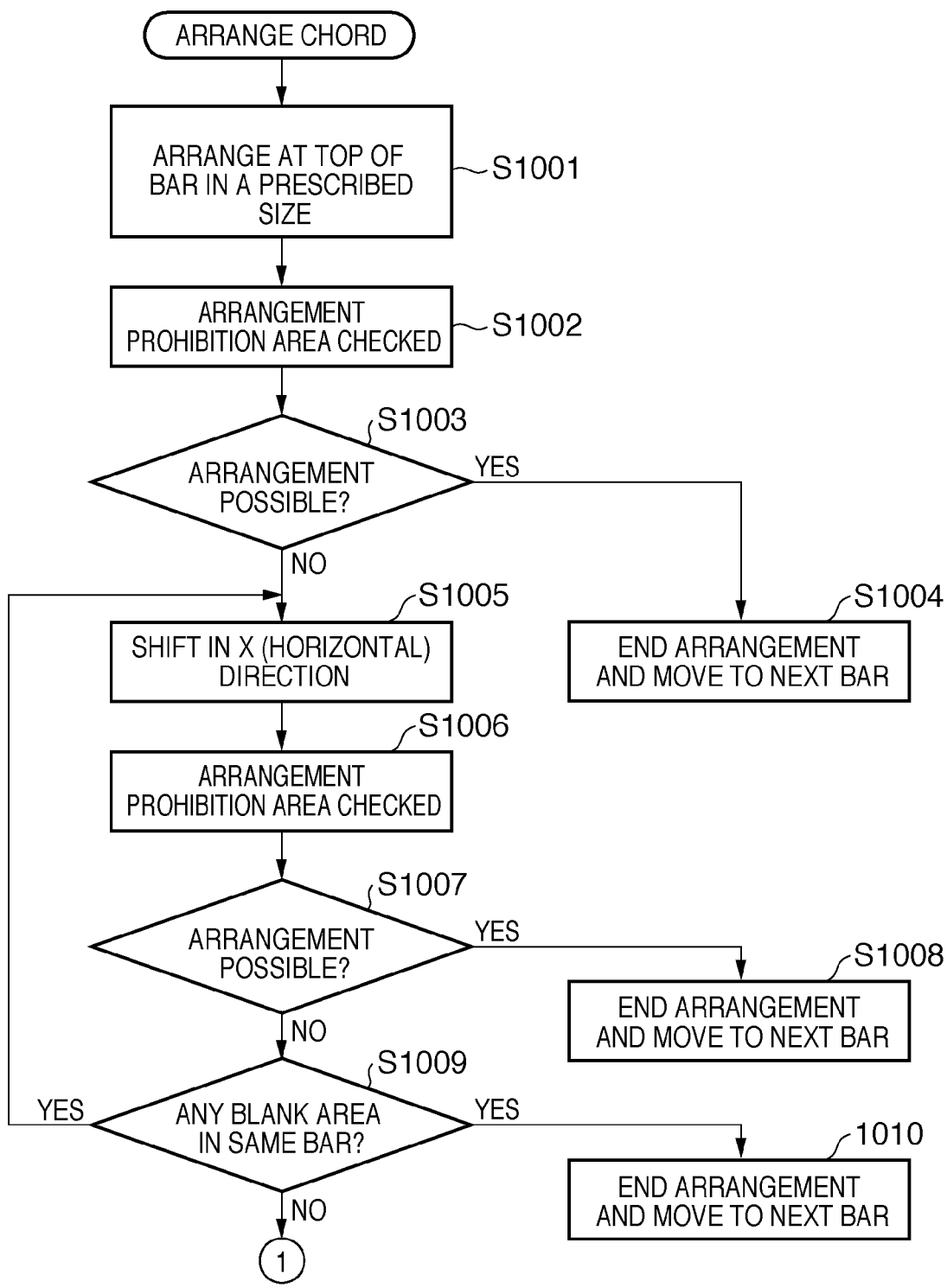
FIGS. 10A and 10B are flowcharts illustrating a procedure of processing for placing an assistance sign.
Figure 10B:
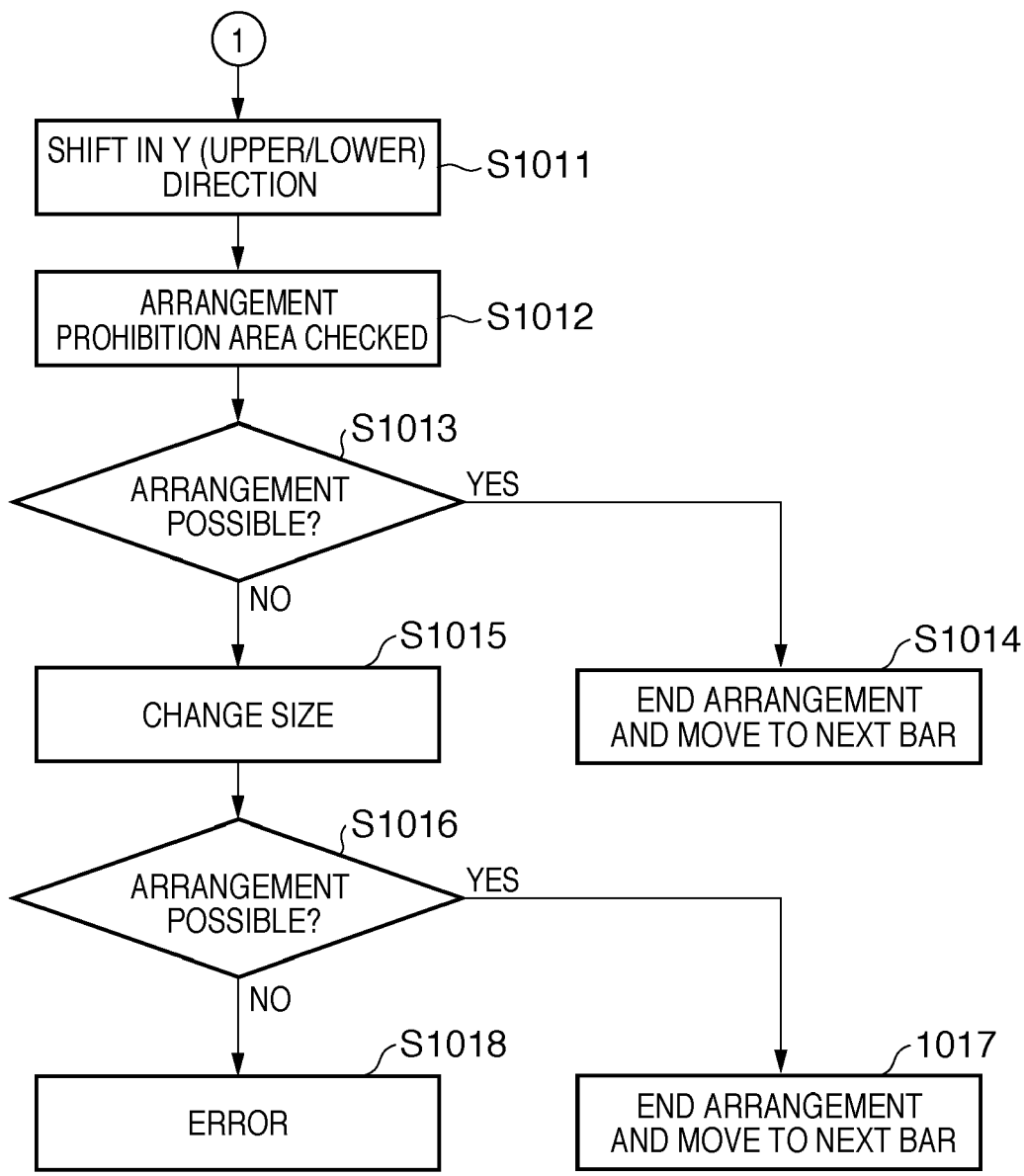

FIGS. 10A and 10B are flowcharts illustrating a procedure of processing for placing assistance signs of the present embodiment. Firstly, in step S1001 it is attempted to place the chord name at the coordinates corresponding to the head of the bar, in the size set as a default or the size calculated from the interval between the staves. Next, in step S1002, the placement region of the attempt in step S1001 and the placement prohibition region are compared. In step S1003, it is determined based on the result of that comparison whether the two regions do not overlap each other, so the attempted placement is possible. Here, if it is determined that the attempted placement is possible, the processing proceeds to step S1004. In step S1004, the placement coordinates of the next attempt are determined to place assistance signs in the next bar, and similar processing is repeated until the final bar. On the other hand, if it is determined that the attempted placement is impossible, the processing proceeds to step S1005.

In step S1005, the chord name is shifted by a prescribed value in the bars progression direction (referred to as X direction), thereby attempting to place the assistance sign. This prescribed value may be set in advance. In steps S1006 and S1007, it is determined whether or not it is possible to place the chord name at the shifted position. Processing in steps S1006 and S1007 is respectively similar to that in steps S1002 and S1003. Here, if it is determined that the attempted placement is possible, the processing proceeds to step S1008, and processing similar to that in step S1004 is performed. On the other hand, if it is determined that the attempted placement is impossible, the processing proceeds to step S1009.

In step S1009, it is determined whether or not there is any other blank area in the same bar, and if there is any other blank area, processing proceeds to step S1010. In step S1010, the assistance sign is continuously shifted in the X direction by a prescribed value at one time, until a placement-possible region is found. When a placement-possible region is found, the next placement coordinates are determined to place assistance signs in the next bar, and similar processing is repeated until the final bar. Here, in the case where no blank area is left in the same bar and no placement-possible region has been found, the processing proceeds from step S1010 to S1011.

When it is determined that there is no other blank area in the same bar in step S1009, the processing proceeds to step S1011. In step S1011, a search is carried out to find out an area available for placing the assistance sign in the upward/downward direction of the stave. In steps S1012 and S1013, it is determined whether it is possible to place the assistance sign at the shifted position. Processing in steps S1012 and S1013 is respectively similar to that in steps S1002 and S1003. Here, if it is determined that it is possible to place the chord name, the processing proceeds to step S1014, and processing similar to that in step S1004 is performed. On the other hand, if it is determined that the attempted placement is impossible, the processing proceeds to step S1015. In step S1015, the size of the chord name is changed. In step S1016, it is determined whether or not it is possible to place the chord name in the changed size. Here, if it is determined that the placement in the changed size is possible, the processing proceeds to step S1017, and processing similar to that in step S1004 is performed. On the other hand, if no blank area is found where the chord name can be placed even in the changed size, error processing is performed in which an error is displayed indicating that the chord name cannot be inserted as an assistance sign.

Third Embodiment

In the present embodiment, a case will be described in which an instruction is given in step S301 to perform editing for inserting a keyboard icon for piano performance (assistance sign 404). Below, only aspects that are different from the first embodiment in the processing shown in FIG. 3 will be described.

In the present embodiment, in step S306, the musical score data detected in step S304 is converted to icon data for piano performance. Since the first bar is composed of "c", "e", "c", and "g" in this order, the icon data in which keys corresponding to these tones are marked is created. In this case, numbers may be used indicating the order of use of the keys, rather than merely marking the keys to be used. In step S307, a blank area where an icon as the assistance sign can be inserted is found through analysis and the icon is placed. At this time, the marks indicating the keys to be used on the added icon may be printed in a different color from at least that of the base icon itself so as to readily attract the user's attention. As a method to analyze the blank area where an icon as the assistance sign can be inserted, the method shown in FIGS. 10A and 10B may be used.

Fourth Embodiment

In the present embodiment, a case will be described in which an instruction is given in step S301 to perform editing for inserting a simple icon for the kids-mode for piano performance (assistance sign 405). Below, only aspects that are different from the first embodiment in the processing shown in FIG. 3 will be described.

In the present embodiment, the musical score data detected in step S304 is converted in step S306 to simple icon data for the kids-mode for piano performance. Since the first bar is composed of "c", "e", "c" and "g" in this order, icon data for the marks that respectively correspond to the tones (for example, "apple", "banana", "apple" and "orange") is created. In step S307, a blank area where an icon as the assistance sign can be inserted is found through analysis, and the icon is placed. At this time, the added icons may be printed in color so as to be readily recognized, or pictures and colors that can be intuitively and easily understood due to the correlation between colors and tones may be chosen.

Fifth Embodiment

When an instruction is given in step S301 to perform editing for inserting a chord for guitar performance (assistance sign 407), the musical score data detected in step S304 is converted to a chord name in step S306. The subsequent processing is the same as in the description in the second embodiment.

Sixth Embodiment

When an instruction is given in step S301 to perform editing for inserting a fret icon for guitar performance (assistance sign 408), the musical score data detected in step S304 is converted to icon data for guitar performance in step S306. Since the first bar is composed of "c", "e", "c" and "g" in this order, icon data is created with the frets corresponding to these tones being marked. In this case, numbers may be used indicating the order of use of the frets, rather than merely marking the frets to be used. The subsequent processing is the same as in the description in the third embodiment.

Seventh Embodiment

When an instruction is given in step S301 to perform editing for inserting kana-readings (shown in a tab sheet in FIGS. 4A and 4B), the musical score data detected in step S304 is converted to data for kana-readings display in step S306. Since the first bar is composed of "c", "e", "c" and "g" in this order, kana-readings data corresponding thereto, i.e., "do", "mi", "do" and "so" are obtained. The subsequent processing is the same as in the description in the first embodiment.

In the above description, when an assistance sign to be added and the sign written in the document are redundant in the image as a result of the processing in step S304, the sign written in the document may be deleted. For example, in the case where a chord name, G, is written in the document for play, one of the redundant signs may be deleted rather than writing both the performance chord and the performance icon on the musical score. Also, the assistance sign and the chord may be re-placed as a pair without using the sign in the document.

Note that the present invention may be applied in a system configured from a plurality of devices (such as a host-computer, an interface device, a reader, a printer and the like), or in an apparatus configured of a single device (for example, a multifunctional peripheral, and a facsimile device). That is, the present invention can be realized by performing part of the analysis processing or the entire analysis processing by a PC, and having only correction processing to be stored in the apparatus. As a result, processing necessary for analysis can be performed outside the apparatus, and therefore cost reduction can be achieved and processing speed can be increased.

Also in the aforementioned embodiments, while an example was described in which image data of the musical score document is input to the image processing apparatus by reading the document with a scanner, the image data may be input to the image processing apparatus in the form of electronic data. In such a case, the image input unit is constituted not by a scanner for reading the document, but by an interface for example, for receiving data from an external apparatus or external storage medium.

Also in the aforementioned embodiments, while an example was described in which a single type of assistance sign is added, two or more types of assistance signs may be added to a single musical score, thereby generating image data. In the case where the musical score data does not have sufficient blank portions for adding assistance signs, the layout of the musical score data may be adjusted so as to widen the space between staves. It should be noted that the type of the musical score is not limited to the stave, and other types of musical scores such as TAB scores may be used as well.

Aspects of the present invention can also be realized by a computer of a system or apparatus (or devices such as a CPU or an MPU) that reads out and executes a program recorded in a memory device to perform the functions of the above-described embodiment(s), and by a method, the steps of which are performed by a computer of a system or apparatus by, for example, reading out and executing a program recorded in a memory device to perform the functions of the above-described embodiment(s). For this purpose, the program is provided to the computer, for example, via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-066903, filed Mar. 18, 2009, which is hereby incorporated by reference herein in its entirety.

What is claimed is:

1. A musical score editing method for editing a musical score by processing image data representing the musical score with an image processing apparatus, the method comprising the steps of:
inputting image data of a musical score document to the image processing apparatus;
detecting a blank area in the musical score based on the input image data; and
generating image data in which an assistance sign has been added in the blank area in correspondence with a sign in the musical score.

2. The musical score editing method according to claim 1, wherein the image data of the musical score document is obtained by reading the musical score document with a reading apparatus, and
the musical score editing method further includes a step of correcting tilting of the musical score, the tilting occurring during the reading with the reading apparatus.

3. The musical score editing method according to claim 1, wherein the generating step further includes a step of changing the size of the assistance sign, and adding the assistance sign whose size has been changed in the blank area.

4. The musical score editing method according to claim 1, further comprising a step of outputting image data generated in the generating step.

5. The musical score editing method according to claim 2, wherein the reading apparatus is a scanner.

6. The musical score editing method according to claim 1, further comprising a step of selecting the type of the assistance sign to be added.

7. An image processing apparatus that processes image data representing a musical score, comprising:
an input unit configured to input image data of a musical score document to the image processing apparatus;
a detection unit configured to detect a blank area in the musical score based on the input image data; and a generation unit configured to generate image data in which an assistance sign has been added in the blank area in correspondence with a sign in the musical score.

8. The image processing apparatus according to claim 7, further comprising a recording unit configured to record image data generated by the generation unit.

9. The image processing apparatus according to claim 7, wherein the input unit is a scanner.

10. The image processing apparatus according to claim 7, further comprising a selection unit configured to select the type of the assistance sign to be added.

11. A computer-readable storage medium storing a program executed in an image processing apparatus for processing image data representing a musical score, the program causing a computer to:
   input image data of a musical score document to the image processing apparatus;
   detect a blank area in the musical score based on the input image data; and
   generate image data in which an assistance sign has been added in the blank area in correspondence with a sign in the musical score.

* * * * *